US008078655B2

(12) United States Patent
Grubov et al.

(10) Patent No.: US 8,078,655 B2
(45) Date of Patent: Dec. 13, 2011

(54) GENERATION OF DATABASE DELTAS AND RESTORATION

(75) Inventors: Soren Grubov, Copenhagen (DK); Mehmet K. Kiziltunc, Glostrup (DK); Thomas Hejlsberg, Horsholm (DK); Torben Meyhoff, Frederikssund (DK)

(73) Assignee: Microsoft Corporation, Redmond, WA (US)

(*) Notice: Subject to any disclaimer, the term of this patent is extended or adjusted under 35 U.S.C. 154(b) by 417 days.

(21) Appl. No.: 12/133,278

(22) Filed: Jun. 4, 2008

(65) Prior Publication Data

US 2009/0307277 A1 Dec. 10, 2009

(51) Int. Cl.
*G06F 7/00* (2006.01)
*G06F 17/00* (2006.01)

(52) U.S. Cl. ................ 707/999.203; 707/610; 707/625; 707/638; 707/695

(58) Field of Classification Search ........................ None
See application file for complete search history.

(56) References Cited

U.S. PATENT DOCUMENTS

| | | | | |
|---|---|---|---|---|
| 5,043,866 | A | 8/1991 | Myre, Jr. et al. | |
| 5,864,849 | A | 1/1999 | Bohannon et al. | |
| 5,996,088 | A | 11/1999 | Frank et al. | |
| 6,014,669 | A | 1/2000 | Slaughter et al. | |
| 6,769,074 | B2 | 7/2004 | Vaitzblit | |
| 6,839,724 | B2 * | 1/2005 | Manchanda et al. | 707/625 |
| 6,983,291 | B1 * | 1/2006 | Cochrane et al. | 707/625 |
| 7,331,000 | B2 | 2/2008 | Ohno et al. | |
| 2001/0044834 | A1 * | 11/2001 | Bradshaw et al. | 709/217 |
| 2002/0107877 | A1 * | 8/2002 | Whiting et al. | 707/204 |
| 2003/0018644 | A1 * | 1/2003 | Bala et al. | 707/100 |
| 2004/0210577 | A1 | 10/2004 | Kundu et al. | |
| 2004/0260678 | A1 | 12/2004 | Verbowski et al. | |
| 2006/0004839 | A1 | 1/2006 | Nagasawa et al. | |
| 2007/0220356 | A1 | 9/2007 | Ruscio et al. | |
| 2007/0226730 | A1 * | 9/2007 | Coyle et al. | 717/170 |
| 2008/0147756 | A1 * | 6/2008 | Stager et al. | 707/204 |

OTHER PUBLICATIONS

Brad M. McGehee, New SQL Data Compare 3.0 Keeps Data in Different Databases Synchronized, Jul. 22, 2005, www.sql-server-performance.com.*

ESRI Developer Network, Table Compare (Data Management), Aug. 22, 2006, edndoc.esri.com.*

Crus, R.A., "Data Recovery in IBM Database 2," IBM Systems Journal, vol. 23, No. 2, 1984, pp. 178-188. http://www.research.ibm.com/journal/sj/232/ibmsj2302H.pdf.

Joshi, Ashok et al., "Checkpointing in Oracle," Proceedings of the 24th International Conference on Very Large Data Bases, 1998, pp. 665-668. http://www.vldb.org/conf/1998/p665.pdf.

(Continued)

*Primary Examiner* — Tony Mahmoudi
*Assistant Examiner* — Yu Zhao
(74) *Attorney, Agent, or Firm* — Perkins Coie LLP

(57) ABSTRACT

A checkpoint system is provided to quickly identify differences or deltas between a baseline version and a modified version of a database and to quickly restore the database to the baseline version using the deltas. The checkpoint system identifies the deltas between versions of the database by a rapid comparison of the rows of each table within a baseline version and a modified version of the database. The checkpoint system can use the rapid comparison when testing to identify sets of deltas resulting from performing an old procedure on a test database and a new procedure on the test database. The rapid comparison can be applied to these sets of deltas to identify differences resulting from the new procedure. The deltas can also be used to rapidly restore a database from a modified version to a baseline version.

9 Claims, 11 Drawing Sheets

OTHER PUBLICATIONS

Lin, Jun-Lin et al., "A Survey of Distributed Database Checkpointing," Distributed and Parallel Databases, vol. 5, Issue 3, Jul. 1997, 34 pages. http://citeseer.ist.psu.edu/cache/papers/cs/29565/http:zSzzSzwww.seas.smu.eduzSz~mhdzSzpubszSz97zSzdpd.pdf/lin97survey.pdf.

* cited by examiner

GENERATION OF DATABASE DELTAS AND RESTORATION

BACKGROUND

Database systems, such as SQL servers, contain vast amounts of information generated and used by application programs. For example, many organizations, such as companies and nonprofit organizations, use application programs to manage financial records, inventories, and transaction histories using database systems. These application programs include point-of-sale programs, accounting programs, customer relation management programs, enterprise resource management programs, security programs, and so on. To support these application programs, an organization may create a database that has hundreds of tables and many fields in each table. For example, a database may include an employee table, a customer table, a product table, an invoice table, an accounts receivable table, a quality assurance table, a maintenance table, an inventory table, and so on. An employee table may include a row for each employee of the organization and include an employee identifier field, an employee address field, an employee start date field, and so on. The employee identifier field may uniquely identify the employee within the organization.

Because of the importance of the information stored in the database of the organization, database systems typically provide mechanisms to back up and restore the databases managed by that system. A backup mechanism may create a complete copy of the database, and the restore mechanism may overwrite the database with the copy. A database system may also use roll forward and roll backward technology to restore a database. Such a database system may log all transactions and use those transactions to restore a database to a particular state by starting at a known prior state and applying transactions that occurred after that state (i.e., roll forward) or by starting at the current state and un-applying transactions that occurred before the current state (i.e., roll backward).

A database system may also provide a snapshot mechanism that allows the state of a database at a snapshot time to be preserved in a "snapshot." Once a snapshot is created, subsequent changes to the database are not reflected in the snapshot. For example, a snapshot of a database may be made at the end of each quarter and quarterly reports can be run against that snapshot even though the database may continue to be modified. Instead of making a complete copy of the database, a snapshot mechanism may copy only those portions of the database as they changed after the snapshot is created. The snapshot technology may monitor for changes in the database and create a copy of those portions that are to be changed. Thus, the state of the database at the time of the snapshot includes the copied portions and the remaining portions of the database that have not been changed.

Each database system may consider its backup and restore technology and snapshot technology to be proprietary. As a result, the format and content of information stored by a database system to support these technologies may not be readily available outside the organization that developed the database system.

During the development of application programs that use a database, the developer typically needs to assess differences in the database resulting from a new version of the application program. To identify the differences, the developer may first perform an old procedure of an old version of the application program on a test database that is in a known state and then perform a new procedure of a new version of the application program on the test database that is in the same known state.

The developer can then identify any differences and determine whether they indicate a problem in the programming of the new procedure.

Because an application program may have hundreds or thousands of procedures that need to be tested, the testing process can be very time-consuming. One aspect of the testing that can be particularly time-consuming is the returning of the test database to the known state after each procedure is performed. Because each procedure may modify the test database, subsequent procedures cannot practically be tested until the test database is returned to the known state. A developer may return the test database to the known state by saving a copy of the test database in the known state (e.g., backing up) and then recopying the test database (e.g., restoring) after each procedure is performed. Because a test database can be very large, it may, however, be impractical for the developer to maintain a copy of the test database in the known state, and it can be very time-consuming to recopy the database. A developer may also return the test database to the known state by using the restore technology provided by the database system. The restoring of a database to the known state can itself, however, be very time-consuming.

SUMMARY

A method and system for identifying differences between versions of the database and restoring the database to a prior version is provided. A checkpoint system is used to quickly identify differences or deltas between a baseline version and a modified version of a database and to quickly restore the database to the baseline version using the deltas. The baseline version may be represented as a snapshot. The checkpoint system identifies the deltas between versions of the database by a rapid comparison of the rows of each table within the baseline version and a modified version of the database. For each table, the checkpoint system identifies rows that have been added, deleted, or modified as deltas between the baseline version and the modified version of the database. The deltas for all the tables represent the differences between the baseline version and the modified version of the database. The checkpoint system can undo the effect of those deltas to restore the database to the baseline version (e.g., when testing an application). During testing, the checkpoint system may identify old deltas between a test version of a database and an old modified version after an old procedure is performed and new deltas between the test version and a new modified version after a new procedure is performed. The checkpoint system can then perform a rapid comparison of the old deltas and new deltas to identify differences that are attributable to the new procedure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
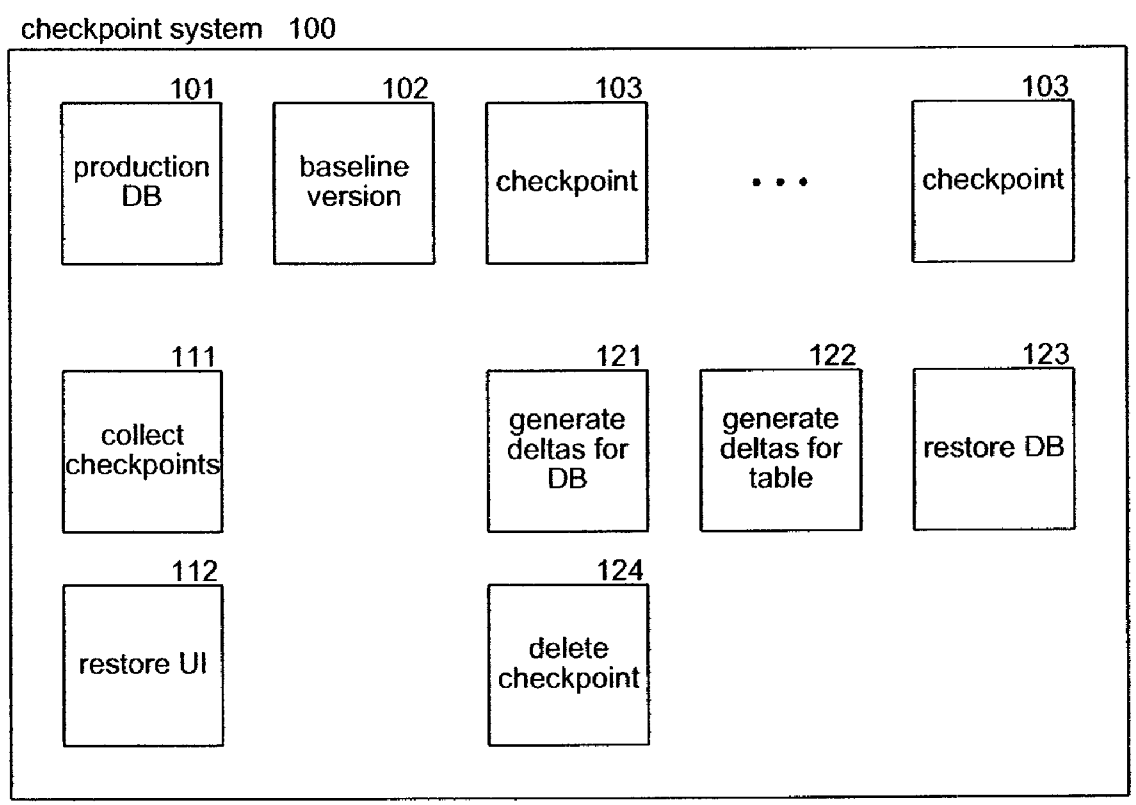
FIG. 1 is a block diagram that illustrates components of a checkpoint system when used for generating checkpoints of a production database in some embodiments.

A method and system for identifying differences between versions of a database and restoring the database to a prior version is provided. In some embodiments, a checkpoint system is used when testing an application program to quickly identify differences or deltas in a test database resulting from performing a new procedure and to quickly restore the test database to its known state after a procedure is performed. A tester who performs the old procedure on the test database and then performs the new procedure on the test database wants to quickly identify any differences between the databases after the procedures are performed. The checkpoint system identifies the deltas between versions of the database by a rapid comparison of the rows of each table within an old modified version and a new modified version of the test database. The old modified version is a version resulting from applying an old procedure to a test version, and the new modified version is a version resulting from applying a new procedure to the test version. The checkpoint system performs the rapid comparison on a table-by-table basis to identify the deltas, referred to as old deltas, between the test version and the old modified version and to identify deltas, referred to as new deltas, between the test version and the new modified version. The rapid comparison is logically described in the following as selecting rows of tables of the test version and the modified version in sequence. One skilled in the art, however, will appreciate that a database system may maintain certain indexes or other data structures to track information that may facilitate the identification of such deltas without having to actually perform such selecting of rows. To identify deltas, for each table, the checkpoint system selects the rows of the table of a modified version and the test version in order of a key field. For example, if the key field of an employee table is an employee identifier, then the checkpoint system selects the rows of the table in order from the lowest employee identifier to the highest employee identifier. The checkpoint system starts by selecting the first row of the table from the modified version and from the test version. The checkpoint system then compares the key fields of the selected rows. If the key fields are the same, then the checkpoint system compares the other fields of the selected rows. If there are any differences in the values in the fields, the checkpoint system saves an indication of the differences as a delta. The checkpoint system then selects the next row of each version. If the key fields are not the same, then the modified version includes a row that has been added or does not include a row that has been deleted. If the key field of the test version is less than the key field of the modified version, then the checkpoint system saves an indication that a row has been deleted and selects the next row of the test version. For example, if the employee identifier for the test row is 25 and for the modified row is 26, then the test row was deleted from the modified version. Because the rows are selected in key field order, if the modified version included a row with an employee identifier of 25, the checkpoint system would have selected that modified row before the modified row with an employee identifier of 26. If the key field of the test version is more than the key field of the modified version, then the checkpoint system saves an indication that a row has been added and selects the next row of the modified version. The checkpoint system continues this process until all the rows of the table have been selected. The saved deltas represent the differences between the test version and the modified version of the database. Because the rows of the table are accessed in key field order, the rows of the tables may be efficiently cached into main memory resulting in reduced access of secondary storage and efficient and rapid comparison of the versions to identify the deltas between the test version and the modified version.

The checkpoint system may use the snapshot mechanism of the database system to create a snapshot of the test version prior to performing an old or a new procedure. The checkpoint system then performs the rapid comparison between the snapshot of the test version and the modified version. The checkpoint system could alternatively create a copy of the test version using the backup technology of the database system. The creating of a complete backup may, however, be too time-consuming to be practical in a test environment.

In some embodiments, the checkpoint system may use this rapid comparison to identify the old deltas (differences between the test version and the old modified version) and the new deltas (differences between the test version and the new modified version) when testing. The checkpoint system may also use the same rapid comparison to identify the differences between the old deltas and the new deltas, which is what a tester may ultimately want to identify. The differences between the old deltas and the new deltas represent the differences in the test database resulting from differences between the old procedure and the new procedure that is being tested. The checkpoint system saves each delta as a row in a delta table. The delta table includes a table identifier field, a key field, an operation field, and a data field. The table identifier field contains an identifier that uniquely identifies the table (e.g., employee table) from which the delta was identified, the key field contains the value of the key field (e.g., employee identifier) from which the delta was identified, the operation field contains an indication of the type of operation (e.g., added, deleted, or changed) performed on a row. The data field may contain the old values (and new values) of fields that have changed including all the fields of a row that has been deleted or added. Thus, the delta tables for the old deltas and the new deltas can be considered to be tables of the database for rapid comparison purposes. Thus, the checkpoint system may apply the rapid comparison as described above to the old delta table and the new delta table to rapidly identify differences in the test database resulting from differences in the old procedure and the new procedure.

In some embodiments, the checkpoint system may use a delta table to quickly restore the test database to its known state. Because a delta table identifies all the differences between a test version and a modified version of the database, the checkpoint system may restore the modified version to the test version by un-applying the deltas of a delta table. For example, after performing an old procedure and generating an old delta table, the checkpoint system may select each row of the old delta table and un-apply its effect. When a row of the delta table indicates that a new row has been added, the checkpoint system deletes that row from the modified version. When a row of the delta table indicates that a row has been deleted, the checkpoint system adds that row to the modified version. When a row of the delta table indicates that a row has changed, the checkpoint system changes the values of the fields of that row to their previous values. When all the rows of the delta table have been processed, the modified version will be restored to the test database in its known state. During testing, the checkpoint system can restore the modified version to the test version after each procedure, old or new, is performed.

In some embodiments, the checkpoint system may be used for saving checkpoints of a non-test or production database for rapid restoration of the production database to a known state. The checkpoint system may initially generate a baseline version of the production database. The checkpoint system may generate the baseline version by creating a copy of the entire database or by using the restore technology of the database system. After the baseline version is generated, the checkpoint system can perform a rapid comparison of the current production version and the baseline version to identify differences as deltas. The checkpoint system may store these deltas as a delta table, referred to as a checkpoint. The checkpoint system may create checkpoints on a periodic basis (e.g., daily). The checkpoints can be used to restore the production database to its version at any time corresponding to a checkpoint. To restore the production database to its state at a desired checkpoint, the checkpoint system can start with either the baseline version or the current production version. If the checkpoint system starts with the baseline version, it applies the deltas in order of creation to the baseline version starting with the first checkpoint through the desired checkpoint. If the checkpoint system starts with the current production version, it un-applies the deltas in reverse order of creation starting with the last checkpoint through the checkpoint immediately after the desired checkpoint. The checkpoint system may need to create a new last checkpoint as a starting point.

In some embodiments, the checkpoint system uses a checkpoint restoration process when generating checkpoints. When a new checkpoint is to be generated, the checkpoint system has a baseline version and some number of prior checkpoints. To generate the checkpoint, which indicates the differences between the version at the time of the last checkpoint and the current version, the checkpoint system needs to generate the version for the last checkpoint. To generate the version for the last checkpoint, the checkpoint system starts with the baseline version and applies the deltas of each checkpoint in order of creation. The checkpoint system then applies the rapid comparison as described above to the restored version for the last checkpoint and the current version to identify the deltas for the new checkpoint. The checkpoint system can maintain as its "baseline version" the version associated with the last checkpoint. In such a case, the checkpoint system does not need to apply all the checkpoints each time a new checkpoint is generated. The checkpoint system would, however, need to un-apply checkpoints to restore a version associated with a prior checkpoint. A checkpoint may be represented by a delta table and its time of creation.

The following tables illustrate example states of a production database (i.e., new database) and a version of that database at the last checkpoint (i.e., old database). The tables show the value of the key and the value of the only other field of the database in this example.

New Database

| Key | Sample Field |
|---|---|
| A | 123 |
| C | 234 |
| D | 345 |
| E | 111 |
| F | 222 |

Old Database

| Key | Sample Field |
|---|---|
| A | 123 |
| B | 899 |
| C | 234 |
| E | 111 |
| F | 333 |
| G | 444 |

The checkpoint system will select pairs of old and new rows as indicated by the number column in the following tables. No. 1 indicates that the first selected rows are both for rows with a key field with the value of A and with another field having a value of 123. Since they are the same, there is no row added to the delta table, and the checkpoint system selects the next pair of rows. No. 2 indicates that since the old row of the next selected pair of rows has a smaller key field (e.g., B<C), then the old row has been deleted and a row is added to the delta table indicating the deletion. The checkpoint system then selects the next old row. No. 3 indicates that the currently selected new and old rows contain the same value for the key field and the same value for the other field. The checkpoint system continues with the processing until there are no more new rows to select as indicated by No. 7. In such a case, any remaining old rows correspond to old rows that have been deleted, and the checkpoint system adds a row to the delta table for each remaining old row.

| No. | Selected New Row | Selected Old Row |
|---|---|---|
| 1 | A/123 | A/123 |
| 2 | C/234 | B/899 |
| 3 | C/234 | C/234 |
| 4 | D/345 | E/111 |
| 5 | E/111 | E/111 |
| 6 | F/222 | F/333 |
| 7 | <EOT> | G/444 |

Delta Table

| Table Name | Key | Operation | |
|---|---|---|---|
| T1 | B | Deleted | 899 |
| T1 | D | Inserted | 345 |
| T1 | F | Changed | 222 |
| T1 | G | Deleted | 444 |

FIG. 1 is a block diagram that illustrates components of a checkpoint system when used for generating checkpoints of a production database in some embodiments. The checkpoint system 100 includes a production database 101, a baseline version 102, and checkpoints 103. The checkpoint system also includes a collect checkpoints component 111, a restore user interface component 112, a generate deltas for database component 121, a generate deltas for table component 122, a restore checkpoint database component 123, and a delete checkpoint component 124. The production database contains the current production database that is actively being modified by one or more application programs. The baseline version is a baseline version of the production database created at some point in time. Each of the checkpoints is a checkpoint indicating the differences between the production database at the time of the creation of the checkpoint and the production database at the time of a previous checkpoint. The baseline version may be considered to be the initial checkpoint. The collect checkpoints component generates the baseline version and periodically generates the checkpoints. The restore user interface component is invoked to allow a user to restore the production database to its state at any checkpoint. The generate deltas for database component is invoked to generate a delta table between the current production database and a version of the production database at the time of last checkpoint. The generate deltas for database component invokes the generate deltas for table component for each table of the database. The restore checkpoint database component is invoked by the restore user interface component to restore the production database to a desired checkpoint. The delete checkpoint component is invoked by the restore user interface component to delete a checkpoint.

Figure 2:
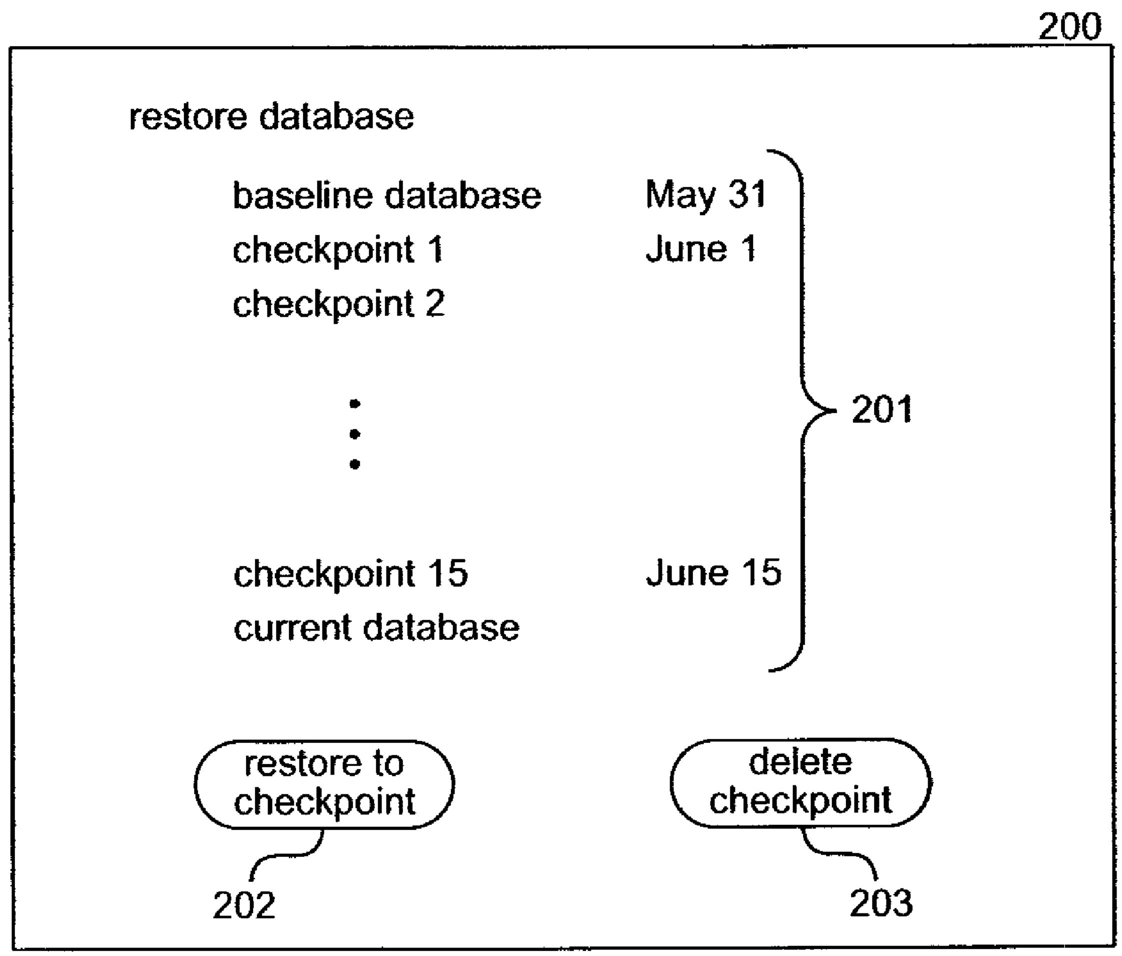
FIG. 2 is a block diagram that illustrates a display page of a restored user interface component in some embodiments.

FIG. 2 is a block diagram that illustrates a display page of a restored user interface component in some embodiments. A display page 200 includes a checkpoint list area 201, a restore checkpoint button 202, and a delete checkpoint button 203. The checkpoint list area lists each of the checkpoints starting from the baseline version along with its date of creation. To restore the current production database to a desired checkpoint, the user selects the checkpoint and then selects the restore checkpoint button. To delete a checkpoint, the user selects a checkpoint and then selects the delete checkpoint button. The process of deleting a checkpoint is described below in detail.

Figure 3:
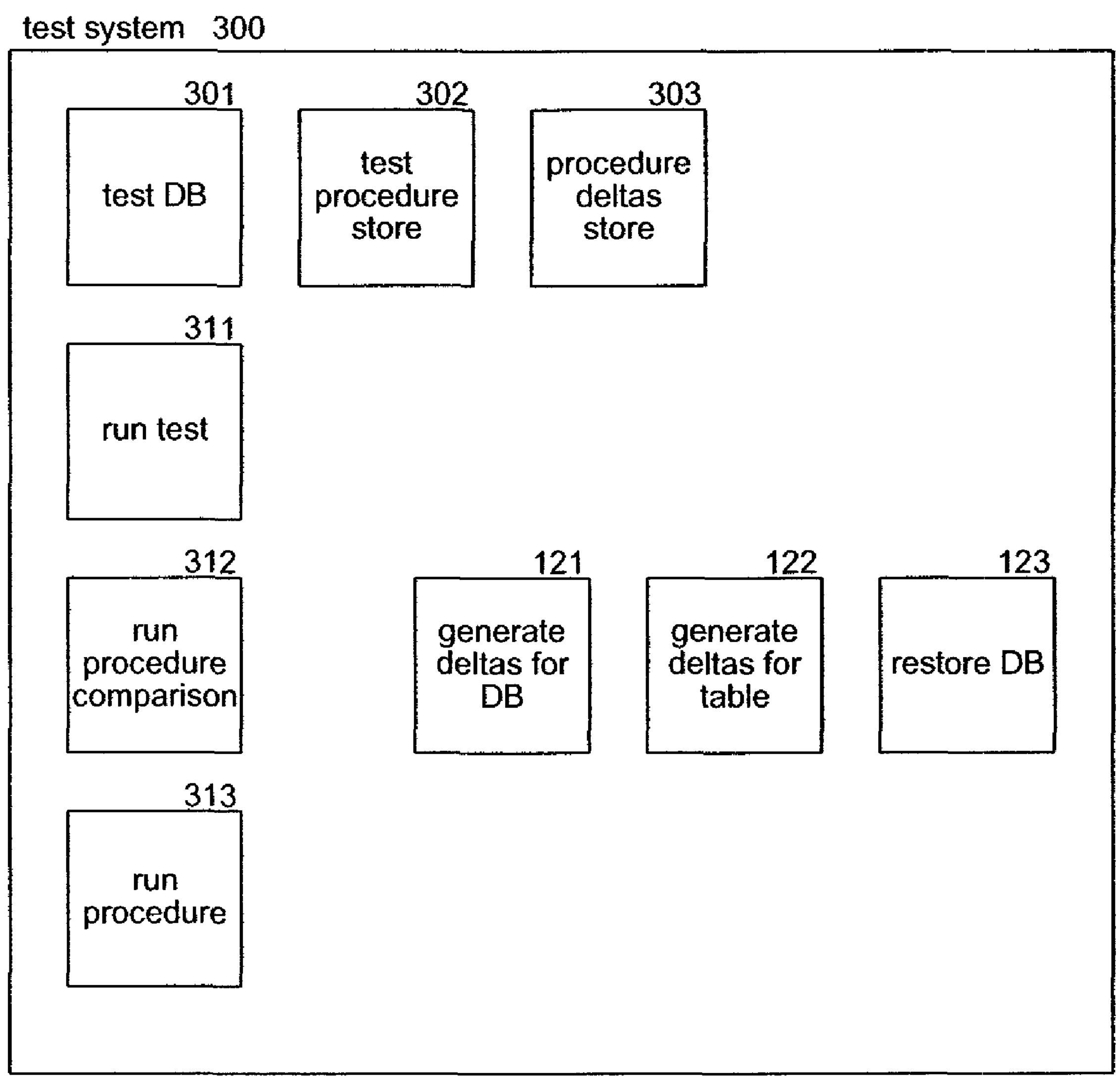
FIG. 3 is a block diagram that illustrates components of the checkpoint system when used in a test environment in some embodiments.

FIG. 3 is a block diagram that illustrates components of the checkpoint system when used in a test environment in some embodiments. A test system 300 includes a test database 301, a test procedure store 302, and a procedure deltas store 303. The test system also includes a run test component 311, a run procedure comparison component 312, and a run procedure component 313. The test system also includes the generate deltas for database component 121, the generate deltas for table component 122, and the restore checkpoint database component 123 as described above. The test database represents the baseline version of the database for testing purposes. The test procedure store contains an indication of pairs of old and new procedures that are to be performed on the test database and their resulting database differences are identified. The procedure deltas store contains the delta tables for each pair of procedures. The run test component controls the overall flow of invoking the old and new procedures, generating a deltas table, and restoring the test database to its baseline version by invoking the run procedure comparison component and the run procedure component.

The checkpoint system may be implemented on a computing device that may include a central processing unit, memory, input devices, output devices, and storage devices, and communication ports. The memory and storage devices are computer-readable storage media that may be encoded with computer-executable instructions that implement the components of the checkpoint system, which means that a computer-readable storage medium contains the instructions. In addition, the instructions, data structures, and message structures may be stored or transmitted via a data transmission medium, such as a signal on a communication link.

Embodiments of the checkpoint system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The components of the checkpoint system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 4:
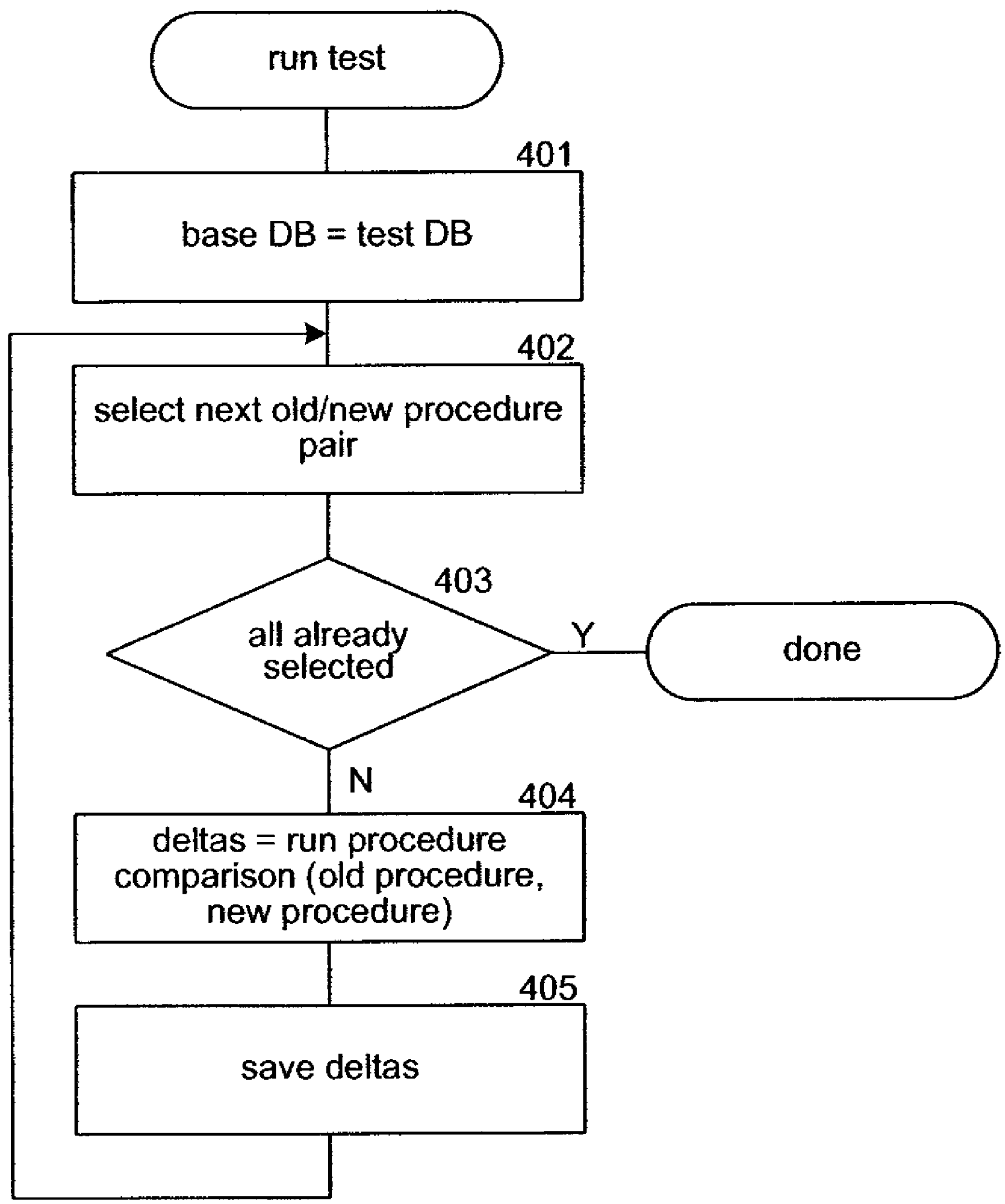
FIG. 4 is a flow diagram that illustrates the processing of a run test procedure component of the checkpoint system in some embodiments.

FIG. 4 is a flow diagram that illustrates the processing of a run test procedure component of the checkpoint system in some embodiments. The component is invoked to perform pairs of old and new procedures, identify the resulting differences in the test database, and to restore the test database. In block 401, the component generates a baseline version of the test database. In blocks 402-405, the component loops selecting each pair of procedures. In block 402, the component selects the next pair of old and new procedures from the test procedure store. In decision block 403, if all the pairs of old and new procedures have already been selected, then the component completes, else the component continues at block 404. In block 404, the component invokes the run procedure comparison component passing an indication of the selected old and new procedures. The invoked component returns the deltas as a delta table identifying the differences between the test database after the old procedure is performed on the test database after the new procedure is performed. The invoked component restores the test database to its baseline version. In block 405, the component saves the deltas in the procedure deltas store and then loops to block 402 to select the next pair of procedures.

Figure 5:
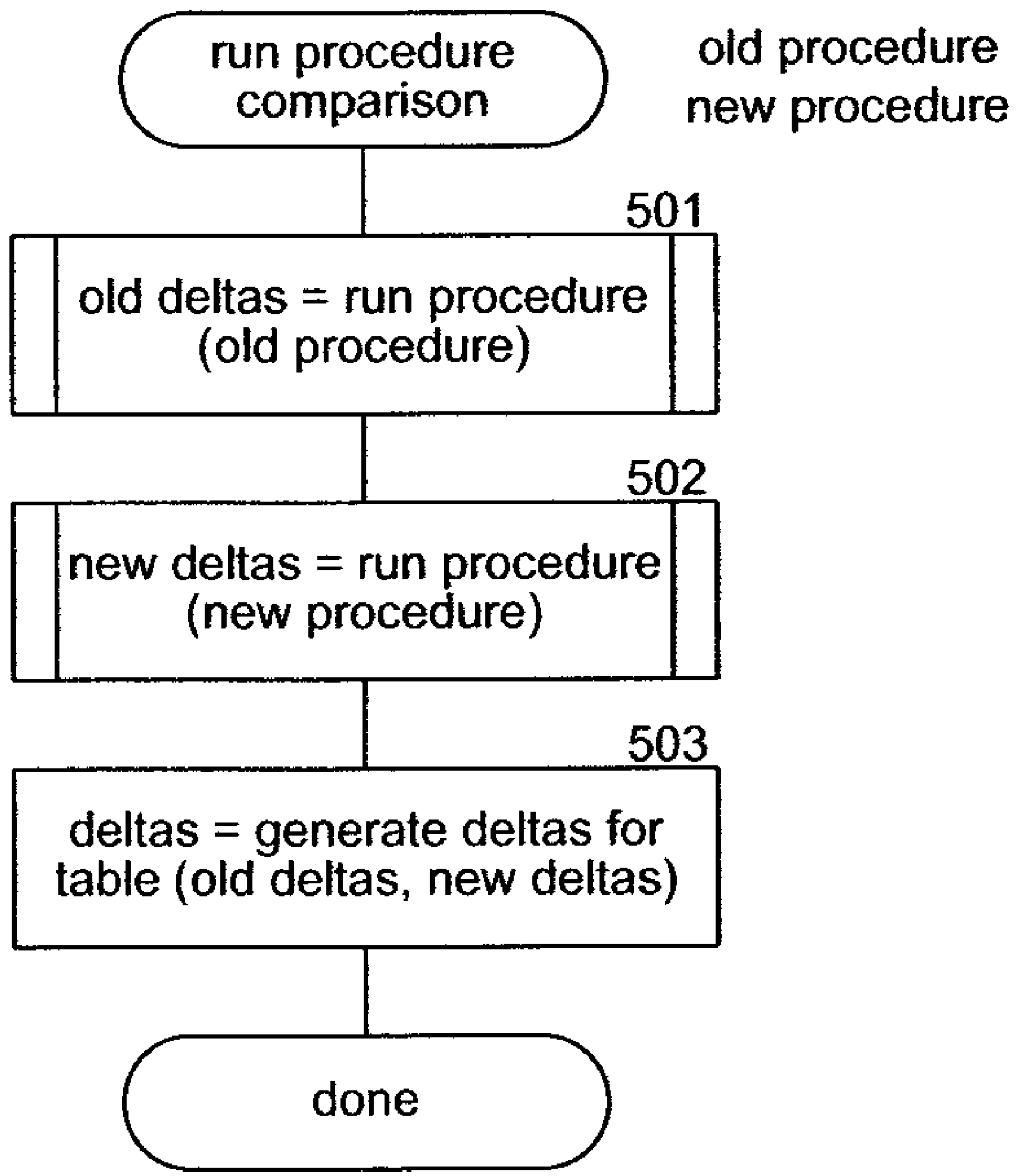
FIG. 5 is a flow diagram that illustrates the processing of a run procedure comparison component of the checkpoint system in some embodiments.

FIG. 5 is a flow diagram that illustrates the processing of a run procedure comparison component of the checkpoint system in some embodiments. The component is passed an old procedure and a new procedure, returns the deltas, and restores the test database. In block 501, the component invokes the run procedure component passing an indication of the old procedure and receives the deltas as old deltas in return. In block 502, the component invokes the run procedure component passing an indication of the new procedure and receives the deltas as new deltas in return. In block 503, the component invokes the generate deltas for table component passing the old deltas and the new deltas to identify the deltas in the test database resulting from differences between the old procedure and the new procedure. The component then returns the deltas.

Figure 6:
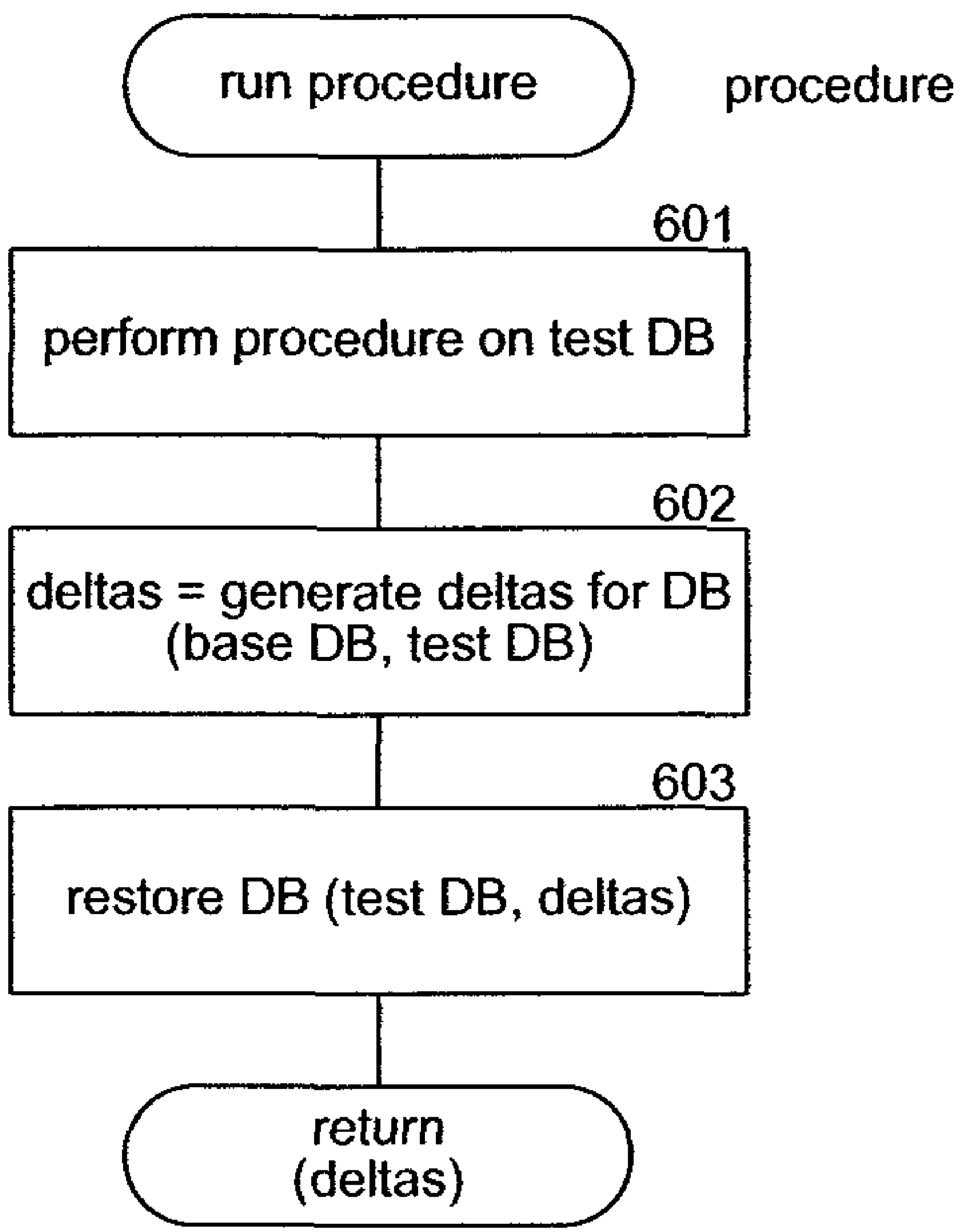
FIG. 6 is a flow diagram that illustrates the processing of a run procedure component of the checkpoint system in some embodiments.

FIG. 6 is a flow diagram that illustrates the processing of a run procedure component of the checkpoint system in some embodiments. The component is passed a procedure and returns an indication of the deltas between the test database before and after the procedure is performed. In block 601, the component performs the procedure on the test database. In block 602, the component invokes the generate deltas for database component passing an indication of the baseline version of the test database and the test database and receives the deltas in return. In block 603, the component invokes the restore checkpoint database component passing an indication of the test database and the deltas to restore the test database to the baseline version based on the deltas. The component then returns the deltas.

Figure 7:
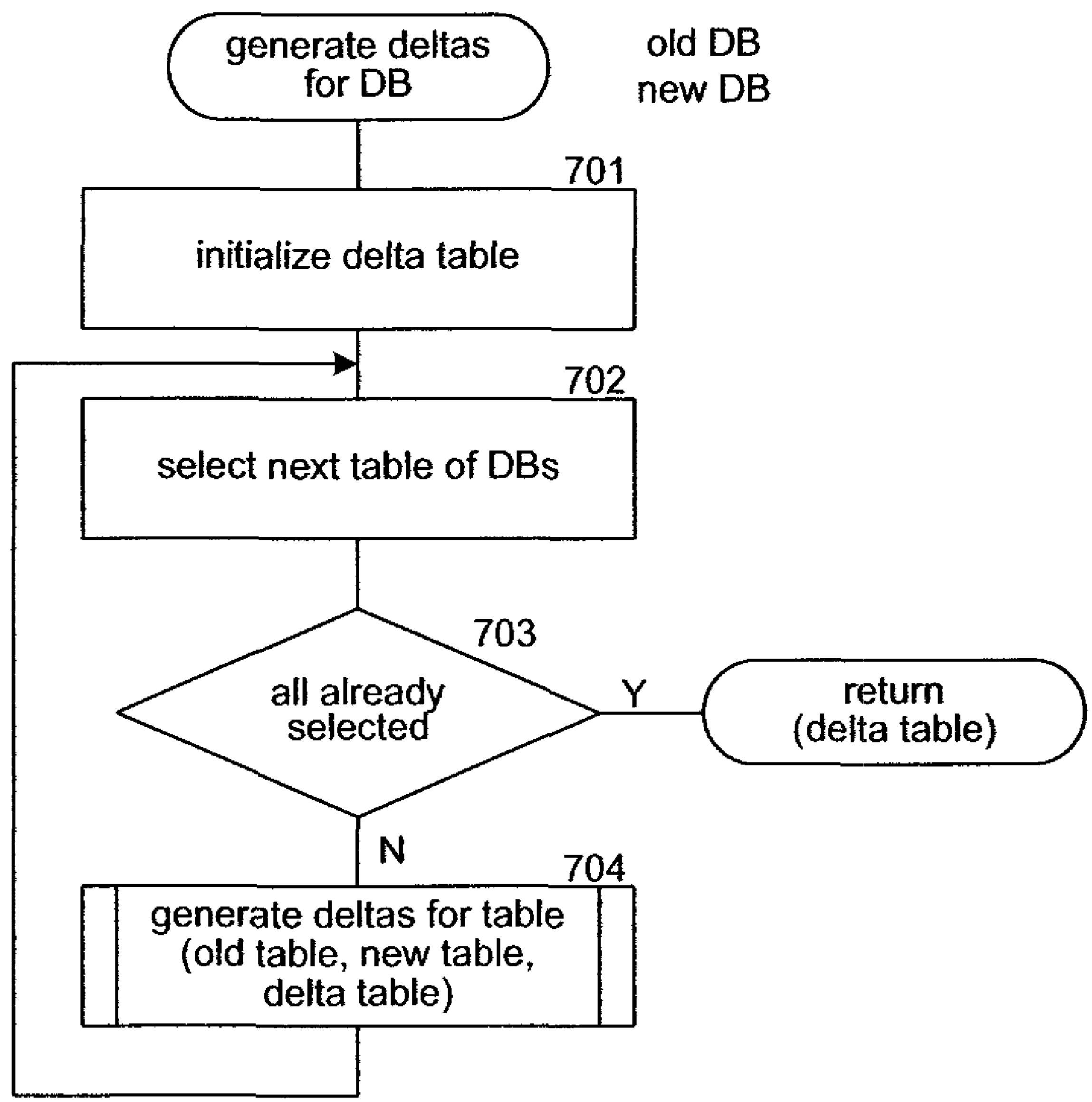
FIG. 7 is a flow diagram that illustrates the processing of a generate deltas for database component of the checkpoint system in some embodiments.

FIG. 7 is a flow diagram that illustrates the processing of a generate deltas for database component of the checkpoint system in some embodiments. The component is passed an indication of an old database and a new database and returns a delta table indicating the differences between the old database and the new database. In block 701, the component initializes the delta table. In blocks 702-704, the component loops selecting each table of the database. In block 702, the component selects the next table of each database. In decision block 703, if all the tables have already been selected, then the component returns the delta table, else the component continues at block 704. In block 704, the component invokes a generate deltas for table component passing an indication of the old table, the new table, and the delta table. The component then loops to block 702 to select the next table of the database.

Figure 8:
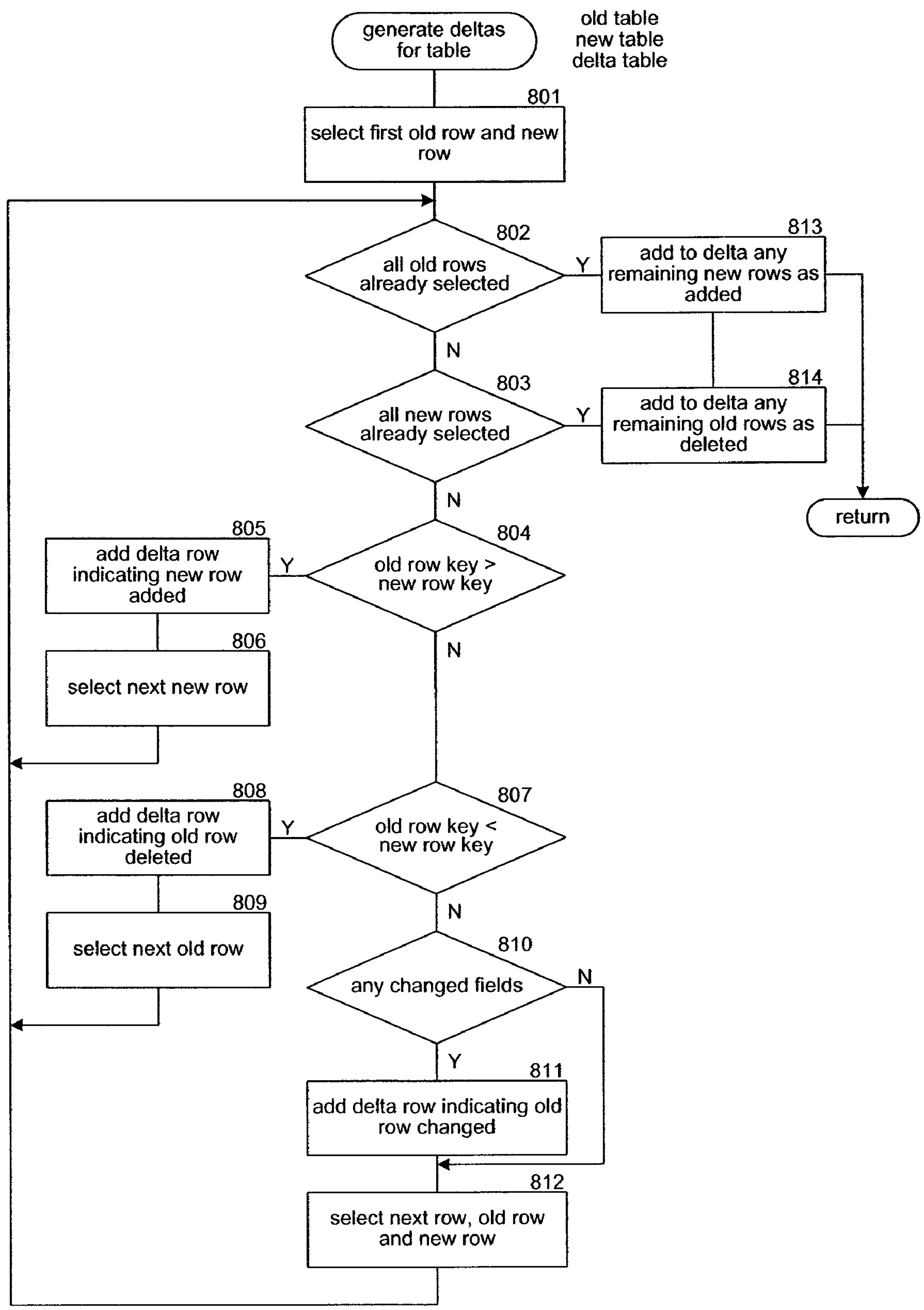
FIG. 8 is a flow diagram that illustrates the processing of a generate deltas for table component of the checkpoint system in some embodiments.

FIG. 8 is a flow diagram that illustrates the processing of a generate deltas for table component of the checkpoint system in some embodiments. The component is passed an old table and a new table of a database and a delta table. The component adds rows to the delta table indicating differences between the old table and the new table. In block 801, the component selects the first old row of the old table and the first new row of the new table. In blocks 802-812, the component loops selecting pairs of rows of the new and old tables. In decision block 802, if all the old rows have already been selected, then the component continues at block 813, else the component continues at block 803. In decision block 803, if all the new rows have already been selected, then the component continues at block 814, else the component continues at block 804. In decision block 804, if the value of the key field of the old row is greater than the value of the key field of the new row, then a new row has been added and the component continues at block 805, else the component continues at block 807. In block 805, the component adds a delta row to the delta table indicating that a new row has been added. In block 806, the component selects the next new row and then loops to block 802. In decision block 807, if the value of the key field of the old row is less than the value of the key field of the new row, then an old row has been deleted and the component continues at block 808, else the component continues at block 810. In block 808, the component adds a delta row to the delta table indicating that the old row has been deleted. In block 809, the component selects the next old row and then loops to block 802. In decision block 810, if any fields of the selected rows are different, then the component continues at block 811, else the component continues at block 812. In block 811, the component adds a delta row indicating the new field values for an old row that has changed. In block 812, the component selects the next old row and the next new row and then loops to block 802. In block 813, the component has selected all the old rows, but there may be some new rows that have not yet been selected. The component adds a delta row indicating a newly added row for any remaining new rows that have not yet been selected and then returns. In block 814, the component has selected all the new rows, but there may be some old rows that have not yet been selected. The component adds a delta row indicating a deleted row for any remaining old rows that have not yet been selected and then returns.

Figure 9:
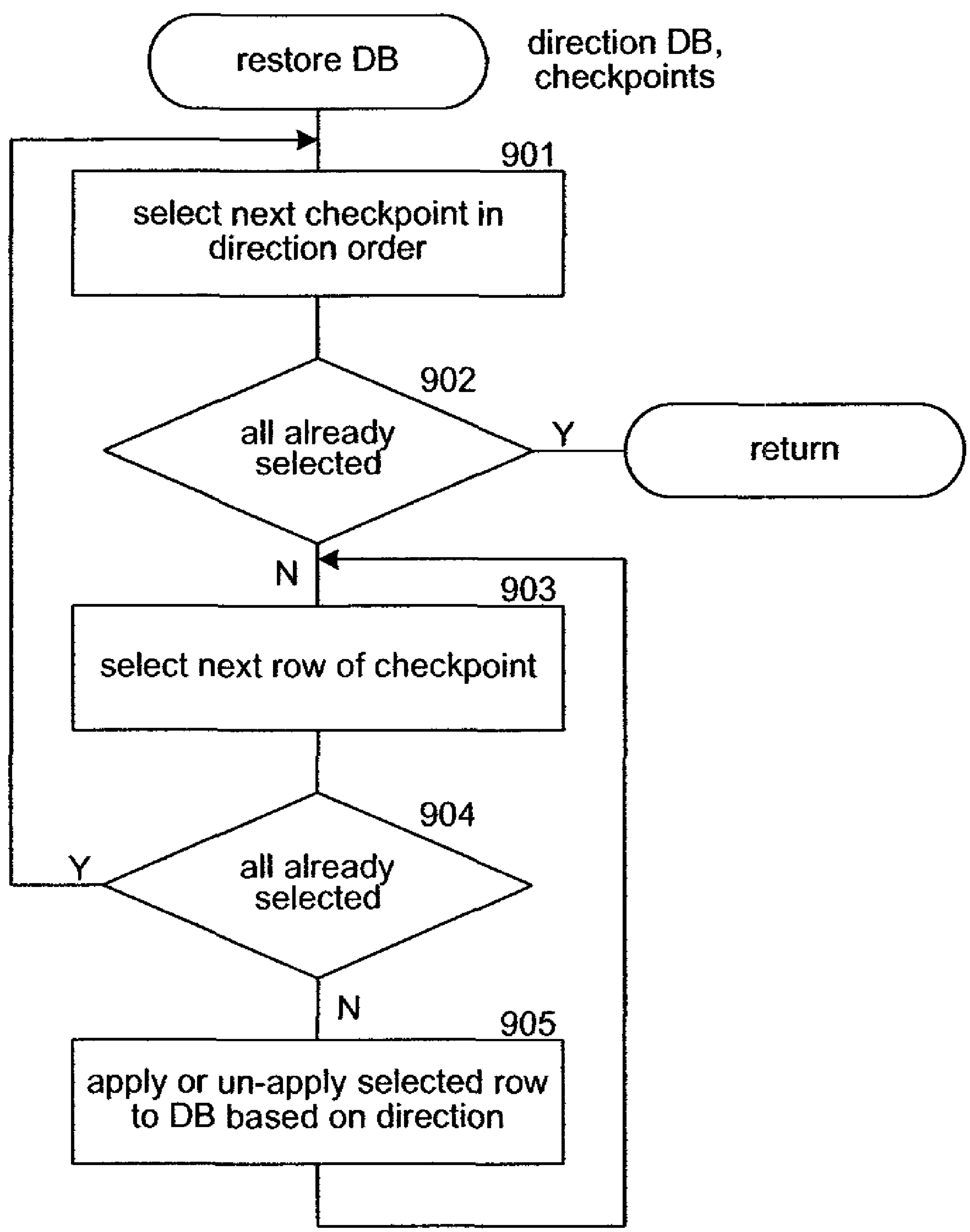
FIG. 9 is a flow diagram that illustrates the processing of a restore checkpoint database component of the checkpoint system in some embodiments.

FIG. 9 is a flow diagram that illustrates the processing of a restore checkpoint database component of the checkpoint system in some embodiments. The component is passed a direction, an indication of a database, and checkpoints. The direction indicates whether the checkpoints should be applied in the forward or backward direction to the database to effect the rolling forward or backward of the database. In blocks 901-905, the component loops selecting the checkpoints in the order of the passed direction and applies or un-applies the deltas of the checkpoints as appropriate. In block 901, the component selects the next checkpoint in the order of the passed direction. In decision block 902, if all the checkpoints have already been selected, then the component returns, else the component continues at block 903. In block 903, the component selects the next row of the selected checkpoint. In decision block 904, if all the rows of the selected checkpoint have already been selected, then the component loops to block 901 to select the next checkpoint, else the component continues at block 905. In block 905, the component applies or un-applies the selected row of the selected checkpoint to the database based on the direction and then loops to block 903 to select the next row of the selected checkpoint.

Figure 10:
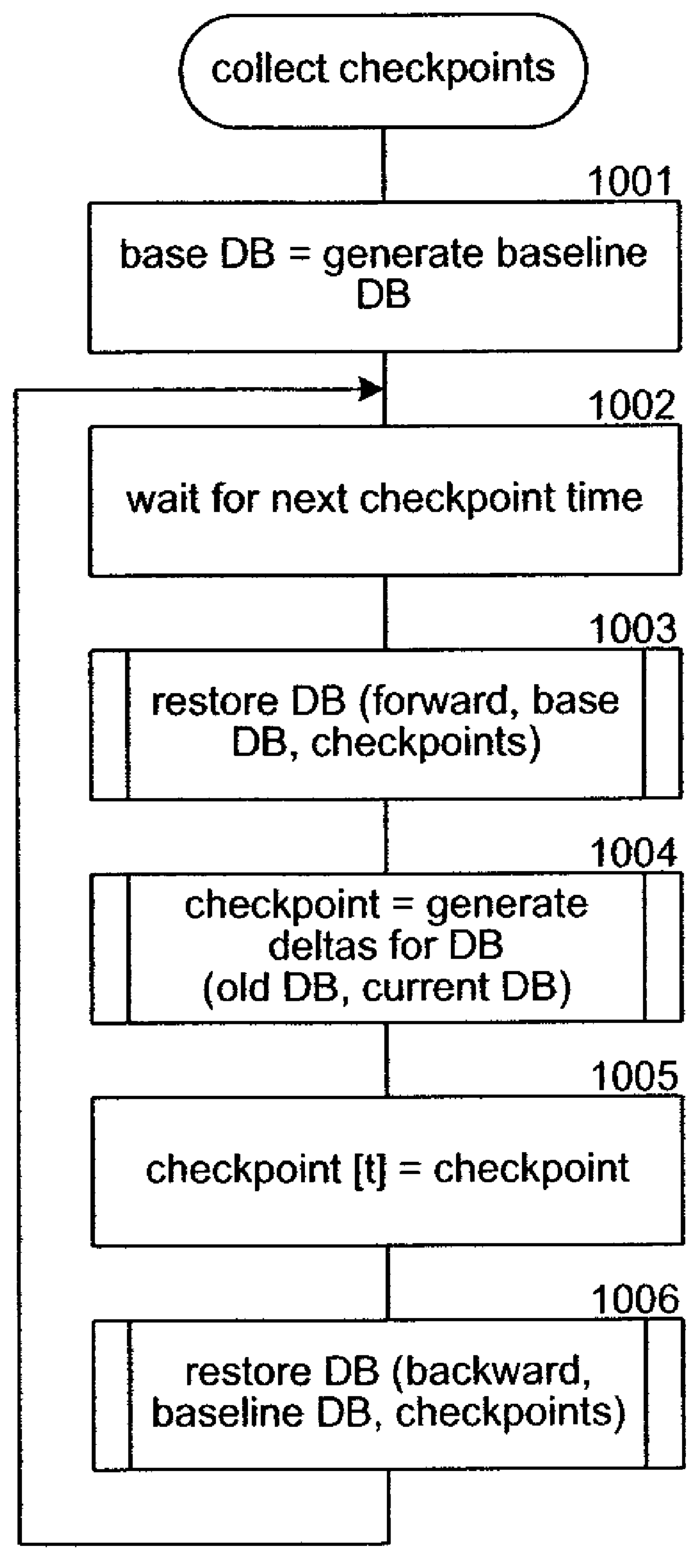
FIG. 10 is a flow diagram that illustrates the processing of a collect checkpoints component of the checkpoint system in some embodiments.

FIG. 10 is a flow diagram that illustrates the processing of a collect checkpoints component of the checkpoint system in some embodiments. The component generates a baseline version of a production database (e.g., creates a snapshot) and then loops generating checkpoints at the appropriate interval that may be periodic or not. In block 1001, the component generates a baseline version of the production database. In block 1002, the component waits for the next checkpoint time. In block 1003, the component invokes the restore checkpoint database component passing an indication of the forward direction, the baseline database, and the checkpoints that have been collected so far. The restore checkpoint database component applies the deltas of the checkpoints to the baseline database to generate a version of the production database at the time of the last checkpoint. In block 1004, the component invokes the generate deltas for database component passing the restored database at the last checkpoint and the current production database and receives the checkpoint as a delta table in return. In block 1005, the component saves the checkpoint. In block 1006, the component invokes the restore checkpoint database component passing an indication of the backward direction, the baseline database, and the checkpoints (except for the last one) to restore the baseline database to its baseline state and then loops to block 1002 to wait for the next checkpoint time. Alternatively, the component may generate a snapshot of the database at the time of the last checkpoint. The component can then generate the deltas between the snapshot and the production database. The component can then discard the snapshot and create a new snapshot for such when collecting the next checkpoint. As another alternative, the component could generate the deltas between the baseline database and the production database and then "subtract" the deltas of the previous checkpoints from the generated deltas to give the new checkpoint.

Figure 11:
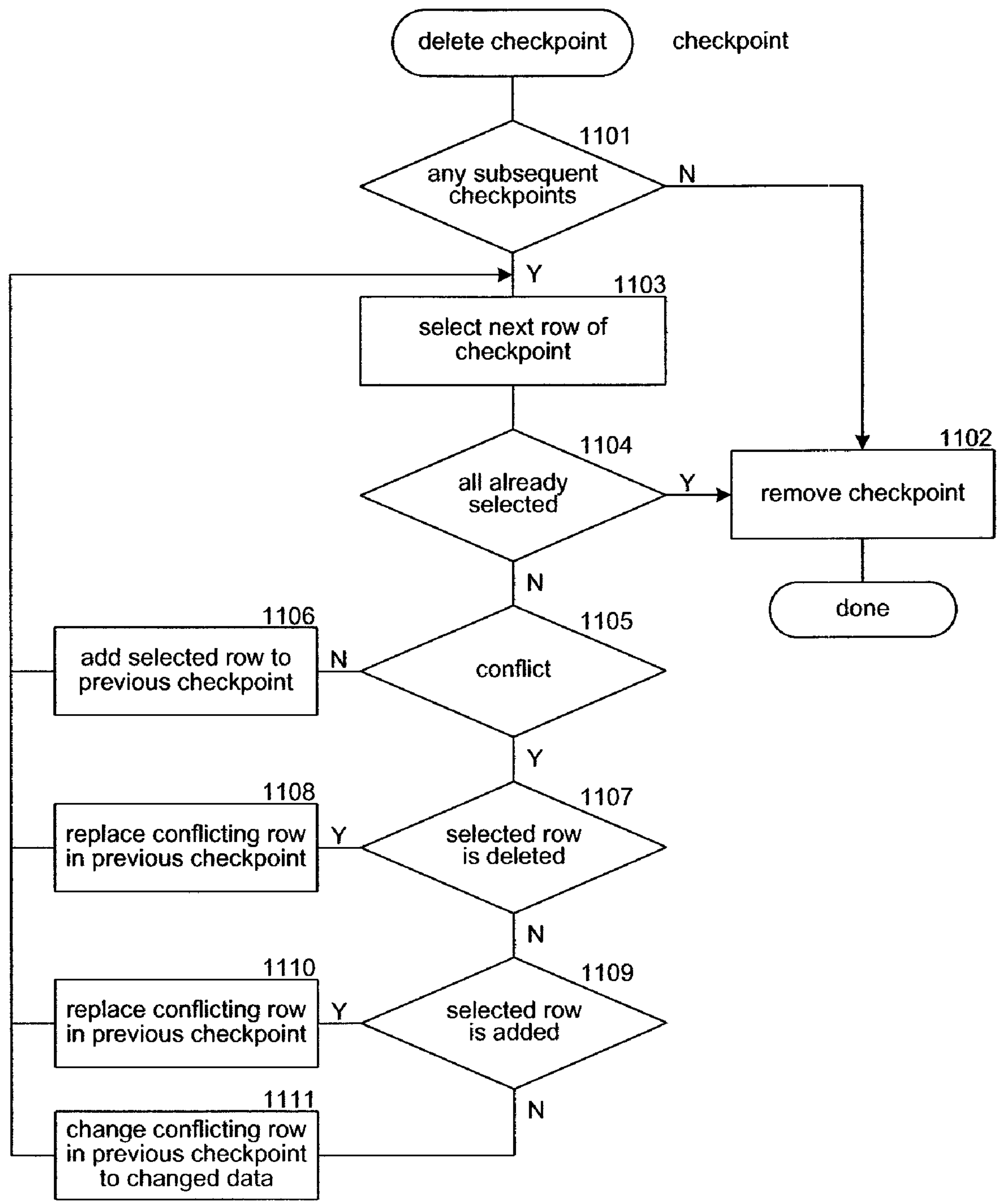
FIG. 11 is a flow diagram that illustrates the processing of a delete checkpoint component of the checkpoint system in some embodiments.

FIG. 11 is a flow diagram that illustrates the processing of a delete checkpoint component of the checkpoint system in some embodiments. The component is passed an indication of a checkpoint to be deleted from a list of checkpoints. In decision block 1101, if there are any checkpoints subsequent to the passed checkpoint, then the component continues at block 1103, else the component removes the checkpoint in block 1102 and completes. In blocks 1103-1111, the component loops merging the checkpoint to be deleted with its previous checkpoint. Alternatively, the component could merge the checkpoint to be deleted with the next checkpoint. In block 1103, the component selects the next row of the checkpoint to be deleted. In decision block 1104, if all the rows of the checkpoint have already been selected, then the component removes the checkpoint in block 1102 and completes, else the component continues at block 1105. In decision block 1105, if the previous checkpoint contains a row with the same values for the table field and key field as the selected row, then a conflict exists and the component continues at block 1107, else the component continues at block 1106. In block 1106, the component adds the selected row to the previous checkpoint and then loops to block 1103 to select the next row of the checkpoint. In decision block 1107, if the selected row indicates a deletion, then the component continues at block 1108, else the component continues at block 1109. In block 1108, the component changes the conflicting row in the previous checkpoint to indicate a deletion and loops to block 1103 to select the next row of the checkpoint. In decision block 1109, if the selected row indicates an addition, then the component continues at block 1110, else the component continues at block 1111. In block 1110, the component replaces the conflicting row in the previous checkpoint with the selected row and loops to block 1103 to select the next row of the checkpoint. In block 1111, the component changes the conflicting row in the previous checkpoint to incorporate the change of the selected row and then loops to block 1103 to select the next row of the checkpoint.

For example, the checkpoint system can be used on databases with the same schema regardless of the underlying database systems. In addition, the checkpoint system may have many other uses than for testing and backup and recovery. For example, the checkpoint system may be used to keep replicated databases up to date. Periodically, the deltas between a current master database and its previous checkpoint can be identified. Those deltas can then be distributed to the replicated databases and used to roll forward to synchronize with the master database. As another example, a person working with an off-line copy of a production database can make changes to the off-line copy and create a delta table that is used to update the production database.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for identifying deltas between versions of a database, the database having a schema that defines tables of the database, fields of each table, and a key field for each table, the method comprising:

providing a delta procedure for identifying deltas between a baseline version and a modified version of the database, the procedure including, for each table of the database, selecting the first row of the baseline version, the rows of the baseline version being selected in an order based on the key field of the version;

selecting the first row of the modified version, the rows of the modified version being selected in an order based on the key field of the version; and repeating the following for the currently selected rows, determining whether the key field of the selected row of the baseline version is the same as the key field of the selected row of the modified version;

upon determining that the key field of the selected row of the baseline version is the same as the key field of the selected row of the modified version, when at least one of the fields of the selected row of the baseline version is different from the at least one of the fields of the selected row of the modified version, saving an indication that the selected row of the baseline version has been changed;

selecting the next row of the baseline version; and selecting the next row of the modified version; and upon determining the key field of the selected row of the baseline version is different from the key field of the selected row of the modified version, determining whether the key field of the selected row of the baseline version and the key field of the selected row of the modified version indicate that a row has been deleted from the modified version or added to the modified version;

upon determining the key field of the selected row of the baseline version and the key field of the selected row of the modified version indicate that a row has been deleted from the modified version, saving an indication that the selected row of the baseline version has been deleted and selecting the next row of the baseline version; and upon determining the key field of the selected row of the baseline version and the key field of the selected row of the modified version indicate that a row has been added to the modified version, saving an indication that the selected row of the modified version has been added and selecting the next row of the modified version;

wherein the saved indications represent deltas between the baseline version and the modified version and wherein a row of each table does not need to be selected multiple times;

performing an old procedure on the database to generate an old modified version of the database;

after performing the old procedure, applying the delta procedure to identify as old deltas the deltas between the baseline version and the old modified version;

restoring the database by un-applying the old deltas to the old modified version of the database;

performing a new procedure on the restored database to generate a new modified version of the database;

after performing the new procedure, applying the delta procedure to identify as new deltas the deltas between the baseline version and the new modified version; and applying the delta procedure to identify deltas between the old deltas and the new deltas as differences in the database when the old and new procedures are performed.

2. The method of claim 1 wherein for each table, when all the rows of the table of the baseline version have already been selected and some remaining rows of the table of the modified version have not yet been selected, saving an indication that any remaining row of the table of the modified version has been added.

3. The method of claim 1 wherein for each table, when all the rows of the table of the modified version have already been selected and some remaining rows of the table of the baseline version have not yet been selected, saving an indication that any remaining row of the table of the baseline version has been deleted.

4. The method of claim 1 wherein the database is an active database, the baseline version is a baseline copy of the active database, the modified version represents the active database, and the deltas represent a creation of a checkpoint of the active database.

5. The method of claim 1 including restoring the new modified version to the baseline version by un-applying the new deltas to the new modified version and performing a test on another pair of old and new procedures.

6. The method of claim 1 wherein the database is implemented by a database system and the identifying is independent of any underlying snapshot technology of the database system.

7. The method of claim 1 wherein the versions of the database correspond to databases implemented by different database systems.

8. A computer-readable storage medium containing instructions for controlling a computing device to identify test deltas between an old modified version of a test database resulting from performing an old procedure and a new modified version of the test database resulting from performing a new procedure, by a method comprising:

providing a delta procedure for identifying deltas between a baseline version and a modified version of the test database, the procedure including, for each table of the test database, selecting a first row of the baseline version, the rows of the baseline version being selected in an order based on a key field of the version;

selecting a first row of the modified version, the rows of the modified version being selected in an order based on the key field of the version; and repeating the following for the currently selected rows, determining whether the key field of the selected row of the baseline version is the same as the key field of the selected row of the modified version;

upon determining that the key field of the selected row of the baseline version is the same as the key field of the selected row of the modified version, when at least one of the fields of the selected row of the baseline version is different from the at least one of the fields of the selected row of the modified version, saving an indication that the selected row of the baseline version has been changed;

selecting the next row of the baseline version; and selecting the next row of the modified version; and upon determining the key field of the selected row of the baseline version is different from the key field of the selected row of the modified version, determining whether the key field of the selected row of the baseline version and the key field of the selected row of the modified version indicate that a row has been deleted from the modified version or added to the modified version;

upon determining the key field of the selected row of the baseline version and the key field of the selected row of the modified version indicate that a row has been deleted from the modified version, saving an indication that the selected row of the baseline version has been deleted and selecting the next row of the baseline version; and upon determining the key field of the selected row of the baseline version and the key field of the selected row of the modified version indicate that a row has been added to the modified version, saving an indication that the selected row of the modified version has been added and selecting the next row of the modified version;

wherein the saved indications represent deltas between the baseline version and the modified version and wherein a row of each table does not need to be selected multiple times; generating a baseline version of the test database; performing the old procedure on the test database resulting in the old modified version of the test database;

after performing the old procedure, applying the delta procedure to identify as old deltas the deltas between the baseline version of the test database and the old modified version of the test database;

restoring the test database by un-applying the old deltas to the old modified version of the test database;

performing the new procedure on the test database resulting in the new modified version of the test database;

after performing the new procedure, applying the delta procedure to identify as new deltas the deltas between the baseline version of the test database and the new modified version of the test database; and applying the delta procedure to identify as test deltas the deltas between the old deltas and the new deltas wherein the old deltas and new deltas represent different versions of the same database.

9. The computer-readable storage medium of claim 8 wherein the database is implemented via a database system that provides a snapshot mechanism and wherein the generating of the baseline version includes applying the snapshot mechanism to the test database.

* * * * *